United States Patent
Verma et al.

(10) Patent No.: US 12,175,234 B2
(45) Date of Patent: Dec. 24, 2024

(54) METHOD AND SYSTEM FOR IMPLEMENTING SAFE DEPLOYMENT OF FEATURES

(71) Applicant: Microsoft Technology Licensing, LLC, Redmond, WA (US)

(72) Inventors: Nidhi Verma, Bellevue, WA (US); Henry Chen, Falls Church, VA (US); Rahul Nigam, Bothell, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 83 days.

(21) Appl. No.: 18/072,450

(22) Filed: Nov. 30, 2022

(65) Prior Publication Data

US 2024/0176609 A1    May 30, 2024

(51) Int. Cl.
*G06F 8/65* (2018.01)
*G06F 8/71* (2018.01)

(52) U.S. Cl.
CPC . *G06F 8/65* (2013.01); *G06F 8/71* (2013.01)

(58) Field of Classification Search
CPC ..................................... G06F 8/65; G06F 8/71
USPC .................................................. 717/120–178
See application file for complete search history.

(56) References Cited

U.S. PATENT DOCUMENTS

| | | | | |
|---|---|---|---|---|
| 7,640,533 B1 * | 12/2009 | Lottero | ..................... | G06F 8/10 717/108 |
| 9,690,567 B2 * | 6/2017 | Bhat | ........................ | G06F 8/65 |
| 10,019,256 B2 * | 7/2018 | Somani | ................. | G06F 11/368 |
| 2005/0132350 A1 * | 6/2005 | Markley | ................... | G06F 8/65 717/174 |
| 2012/0324417 A1 * | 12/2012 | Somani | ..................... | G06F 8/30 717/101 |
| 2020/0034282 A1 * | 1/2020 | He | ...................... | G06F 11/3684 |
| 2020/0125485 A1 * | 4/2020 | Wiener | .............. | G06F 11/3688 |

(Continued)

OTHER PUBLICATIONS

Robillard, Martin P., and Gail C. Murphy. "Concern graphs: finding and describing concerns using structural program dependencies." Proceedings of the 24th international conference on Software engineering. 2002. pp.406-416 (Year: 2002).*

(Continued)

*Primary Examiner* — Satish Rampuria
(74) *Attorney, Agent, or Firm* — NovoTechIP International PLLC

(57) ABSTRACT

A method of and system for implementing a safe deployment of a first feature in a computing environment is carried out by receiving registration information for the first feature, the registration information including a second feature on which the first feature depends or a feature type on which the first feature depends. Based on the second feature or the feature type, a target build version that meets dependency requirements of the second feature or the feature type is then identified before obtaining a list of build versions for a plurality of computing devices in the computing environment. From among the plurality of computing devices, one or more computing devices that have build versions that meet the target build version are then identified before marking the identified computing devices as being available for deployment of the feature and advancing deployment of the feature to those computing devices.

17 Claims, 6 Drawing Sheets

(56) References Cited

U.S. PATENT DOCUMENTS

2022/0156053 A1* 5/2022 Shaastry .................. G06F 8/71
2022/0334819 A1* 10/2022 R ............................. G06F 8/61

OTHER PUBLICATIONS

Kitchenham, Barbara, Shari Lawrence Pfleeger, and Norman Fenton. "Towards a framework for software measurement validation." IEEE Transactions on software Engineering 21.12 (1995): pp. 929-944. (Year: 1995).*

Macho, Christian, Shane McIntosh, and Martin Pinzger. "Automatically repairing dependency-related build breakage." 2018 ieee 25th international conference on software analysis, evolution and reengineering (saner). IEEE, 2018. pp.1-12 (Year: 2018).*

Li, Zhen, et al. "Sysevr: A framework for using deep learning to detect software vulnerabilities." IEEE Transactions on Dependable and Secure Computing 19.4 (2021): pp. 2244-2258. (Year: 2021).*

Gyimóthy, Tibor, Rudolf Ferenc, and Istvan Siket. "Empirical validation of object-oriented metrics on open source software for fault prediction." IEEE Transactions on Software engineering 31.10 (2005): 897-910. (Year: 2005).*

Hutchinson, Ben, et al. "Towards accountability for machine learning datasets: Practices from software engineering and infrastructure." Proceedings of the 2021 ACM Conference on Fairness, Accountability, and Transparency. 2021.pp. 560-575 (Year: 2021).*

* cited by examiner

| Capacity Unit | Version |
|---|---|
| 1 | V |
| 2 | V |
| 3 | X |
| 4 | V |
| 5 | X |
| 6 | V |
| 7 | V |
| 8 | X |
| 9 | X |
| 10 | V |

(arrow from top COLDER to bottom HOTTER)

FIG. 3

METHOD AND SYSTEM FOR IMPLEMENTING SAFE DEPLOYMENT OF FEATURES

BACKGROUND

In recent years, development and improvement of software applications has been occurring more frequently and rapidly. As a result of the rapid development cycle, changes are often developed and deployed to computing devices at highly frequent levels. For example, at any given minute hundreds of scheduled and unscheduled code changes or configuration updates are often deployed or rolled back across various infrastructure components of different computing cloud services. Because a new feature or change is likely to have unknown defects or design flaws, software changes are often not applied to all devices in a computing environment at the same time. Instead, a change is deployed in stages to different groups of devices. For example, a small percentage of devices may receive a new feature first. Once this group has utilized the feature for a given time period and if they have not encountered significant problems, the feature may be provided to a next group of devices. This process may be gradually ramped up until all devices in the computing environment have received the new feature. This results in various devices having different versions of a software application.

Often time a new feature or change relies upon other features in an application. For example, a code change that modifies the color of a user interface banner relies upon the banner being present in the user interface. If the addition of the banner is also a recent change, the banner is not present in previous versions of the software application. When the code change implementing the color modification of the banner is deployed to a device with a version of the software application that does not have the banner yet, this can result in an error or outage of the software application. Given the number and frequency of changes and the fact that changes are deployed in different stages to various devices and server farms, the chances of some changes being deployed before an underlying change has been applied are relatively high. This can result in numerous errors and customer facing issues. Furthermore, because different changes may be on different deployment plans and are applied to distinct devices at different times, determining when a change should be applied to avoid reliability issues is a complex undertaking.

Hence, there is a need for improved systems and methods for implementing safe deployment practices for software changes.

SUMMARY

In one general aspect, the instant disclosure describes a data processing system having a processor and a memory in communication with the processor, where the memory comprises executable instructions that, when executed by the processor, cause the data processing system to perform multiple functions. These functions include receiving information about a first feature, the first feature being a feature that has become available for being deployed in a computing environment, the information received including feature dependency information, wherein the dependency information indicates a dependency requirement for the first feature; identifying, based on the dependency information, a target build version that meets the dependency requirement; determining that a computing device meets the target build version; upon determining that the computing device meets the target build version, attributing a tag to the computing device, the tag identifying the computing device as being available for deployment of the feature; and advancing deployment of the feature to the computing device.

In another general aspect the instant disclosure describes a method for implementing a safe deployment of a first feature in a computing environment. The method includes receiving registration information for the first feature, the registration information including at least one of a second feature on which the first feature depends and a feature type on which the first feature depends; identifying, based on the second feature or the feature type, a target build version that meets dependency requirements of the second feature or the feature type; obtaining a list of build versions for a plurality of computing devices in the computing environment; identifying, from among the plurality of computing devices, one or more computing devices that have build versions that meet the target build version; marking one or more computing devices as being available for deployment of the feature; and advancing deployment of the feature to the one or more computing devices.

In yet another general aspect, the instant disclosure describes a non-transitory computer readable medium on which are stored instructions that when executed cause a programmable device to perform functions of receiving information about a first feature, the first feature being a feature that has become available for being deployed in a computing environment, the information received including feature dependency information, wherein the dependency information indicates a dependency requirement for the first feature; identifying, based on the dependency information, a target build version that meets the dependency requirement; determining that a computing device meets the target build version; upon determining that the computing device meets the target build version, attributing a tag to the computing device, the tag identifying the computing device as being available for deployment of the feature; and advancing deployment of the feature to the computing device.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

FIG. 3 depicts an example list of farms having different farm temperature and version numbers.

DETAILED DESCRIPTION

Figure 1:
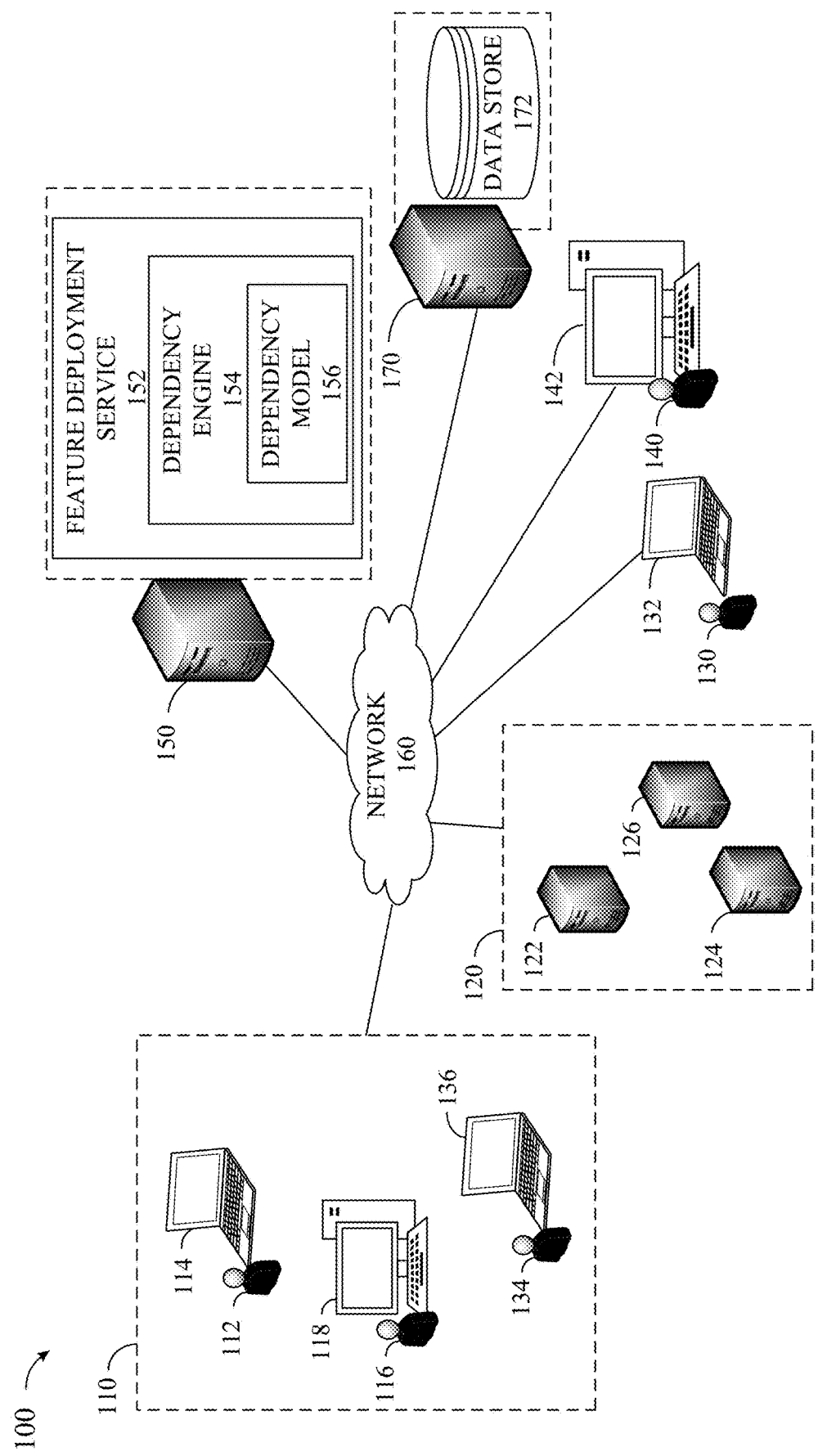
FIG. 1 illustrates an example system upon which aspects of this disclosure may be implemented.

When a new software change becomes available for use, development teams often deploy the change in multiple stages to different devices in a computing environment. For example, the change may be deployed to different server farms at staggered time intervals to ensure significant errors or issues are caught and addressed before the change is exposed to all users. However, the parameters used for determining which devices should receive a change often vary. Sometimes, changes are deployed to devices at random. As a result, different devices often receive different changes at varying times. Thus, a later generated change may be applied to a device before the previous change has been deployed to that device. Software changes, however, often depend on previous changes. Yet, because of staged deployment of changes and because of the number and frequency of changes created by development teams, a later developed change can be deployed to a device before a previous change upon which it depends has been applied. Similar problems and more may occur when a change is rolled back. These issues can lead to errors, and computer and software outages. In many instances, users are left to investigate the cause of such issues which often takes a significant amount of time and user resources. In the meantime, many computing devices and cloud services may be unavailable for use. Thus, there exists a technical problem of frequent errors and outages in computing systems caused by out of cycle deployment of changes.

Currently, when a changed is provided for deployment, there are no mechanisms for determining if the change is dependent upon other changes. Furthermore, even if a developer were to provide information about the dependency, there are no available procedures for confirming that the dependencies of a given change have reached a certain stage. This leaves the computing environments in states in which changes may be advanced before all dependencies are met, thus resulting in unnecessary errors and outages. Thus, there exists another technical problem of lack of mechanisms for providing dependency information for software changes and for ensuring dependencies are met before a change is applied to a device.

To address these technical problems and more, in an example, this description provides a technical solution for providing cross dependent capability to software changes. This is achieved by offering a mechanism to a user to enter dependency information for a given change when the change is being released. The dependency information may be provided via a user interface (UI) element. The dependency information is then stored and examined against other changes in the system when the change is being applied to devices. In some implementations, this involves checking a build version when generating a deployment plan for a change. Other parameters may be taken into account to ensure each change is deployed when all of its cross dependencies have been met. Cross dependency check may include performing a cross reference dependent code check, performing a specific build version limit check, performing a cross cloud offering check (e.g., public versus government cloud), performing dependency check on back end, front end, servers and client codes, performing dependency checks on specific features, managing cross dependency based on date and/or time, managing cross dependency based on risk of changes, and managing cross dependency based on customer input and their market type (e.g., finance, educational, hospitality, etc.). These various dependency checks are performed both during deployment and rollback of changes. Thus, the technical solution provides an efficient mechanism for checking cross dependency of software changes and ensuring that changes are deployed in a proper order.

The technical solution described herein addresses the technical problem of inability of current mechanisms to take feature dependency into account in deployment or rolling back features. The technical solution provides an efficient and accurate mechanism for performing a cross dependency check when software changes are deployed and/or rolled back to different devices and users. The technical effects at least include (1) improving the operation of computing systems by reducing the number of errors and outages caused by out of order implementation of interdependent changes to server farms, computing devices and/or cloud servers; (2) reducing the amount of user time and resources required to investigate and address computer outages and errors caused by deployments/rollbacks; and (3) improving the efficiency of checking for cross dependency by utilizing build version numbers and automatically determining interdependencies.

As will be understood by persons of skill in the art upon reading this disclosure, benefits and advantages provided by such implementations can include, but are not limited to, increased user and/or tenant satisfaction and more accurate deployment of changes. Technical solutions and implementations provided here optimize and improve the deployment and rollback process of features. The benefits provided by these technology-based solutions include improving consumer satisfaction. Furthermore, the technical solutions improve the process of feature deployment/rollback and as such improve implementation of new and updated applications, and thus improving operation of computer devices.

As used herein, the terms "change," "software change," "feature" or "payload" may refer to a particular change to a software application that involves alteration of code or configuration. The change can happen in the client codebase or in the backend codebase on the server. A change can be as large as an application redesign, and as small as a few lines of code or configuration change which is not visible to users. Furthermore, as used herein, "deployment" may refer to the process of exposing a change to computing devices. The deployment process may start with no users having exposure to the new feature and end with the feature being available to all users. The term "parent change" is used herein to refer to a change upon which another change depends. A parent change is thus a change that needs to be completed before a new change can be rolled out. The term "staged deployment" may refer to the breaking of the deployment process into different stages, with each stage having a different proportion of the devices exposed to the new feature. A "software application" (or "application") may refer to any computer program designed to perform a group of coordinated functions, tasks, or activities, such as, antivirus application, productivity suite, media creation application, and the like.

FIG. 1 illustrates an example system 100, upon which aspects of this disclosure may be implemented. The system 100 includes an enterprise tenant 110, a server farm 120, as well as a plurality of consumer tenants including a first consumer tenant 130 and a second consumer tenant 140. Each of the enterprise tenants include a plurality of users each having one or more client devices. For example, the tenant 110 includes a user 112 associated with (e.g., in possession of or using) a client device 114, a user 116 associated with a client device 118 and a user 134 associated with a client device 136. The server includes a plurality of servers including servers 122, 124 and 126. Each of the consumer tenants are also associated with a client device. For example, consumer tenant 130 is associated with the client device 132 and consumer tenant 140 is associated with the client device 142. In some implementations, two or more tenants form a cluster (not shown). Each of the enterprise tenant 110, server farm 120, and consumer tenants 130 and 140 are merely representative of enterprise tenants, server farms and consumer tenants that can be used in an example system. A computing environment may include many more enterprise tenants, server farms and/or consumer tenants. Some of the server farms are cloud computing server farms that include virtual machines or virtual farms. Furthermore, a given computing environment may only include server farms, enterprise tenants and/or consumer tenants.

The system 100 also included a server 150 which contains and/or executes a feature deployment service 152. The server 150 may operate as a cloud-based server for providing feature deployment services The server 150 may also operate as a shared resource server located at an enterprise accessible by various tenant client devices such as client devices 114, 118, 132, 136, and 142. Although shown as one server, the server 150 may represent multiple servers for performing various different operations. For example, the server 150 may include one or more processing servers for performing the operations of the feature deployment service 152 and dependency engine 154.

The feature deployment service 152 provides for staged deployment of one or more new features. For example, the deployment service 152 may have access to information regarding the client devices, enterprises, servers, and/or server farms (e.g., computing capacity units) to which a new feature may apply (e.g., devices, servers and/or enterprises that use an application to which the feature applies). This information may be stored locally in the server 150 or it may be stored in a storage server 170 containing a data store 172. The data store 172 functions as a repository in which deployment management databases are stored. The deployment management database includes information relating to deployment of features to users, enterprises, and/or servers. This information may include various metrics such as a list of changes and their status, the number of servers in a server farm, the number of users in each enterprise, client devices and applications used by each user, information related to the temperature of a server or server farm (e.g., the amount of time spent on each application, the number of incidents reported by each enterprise and/or consumer, parameters relating to enterprises and the like), deployment/rollback states of a given feature, dependency of features and the like.

The deployment service 152 utilizes the stored information and/or data relating to the new feature to generate a deployment plan for a new feature and/or rollback. The deployment plan may include the number of deployment stages, the percentage of server farms, servers, and/or computing devices at each stage and/or the time period for each stage. The deployment plan also includes dependency data. The dependency data specifies a previous feature on which a given feature depends. The deployment service 152 utilizes the dependency engine 154 to determine dependency information and relationships for a given feature. Determining dependency may involve examining the feature(s) on which a new feature depends and checking the dependency of those features to determine what features they depend on to generate a dependency tree. In some implementations, the dependency tree is used to generate a dependency graph which can be displayed to developers via a user interface element. The dependency graph can then be used by developers and/or administrators to gain an overview of the dependencies in changes on an application and/or computing system. The dependency graph can also be used to predict when a certain change will be deployed to a specific population, region, or farm.

Determining dependency may include examining build versions of the software application to determine a target build version required for a new feature. The target build version refers to the earliest version of the software application that includes all of the features on which a new feature depends. In some implementations, the target build version is provided by the developer when they register a new feature. In other implementations, the developer enters dependency information for the new feature, and the dependency engine 154 identifies the target build version. A user may register a new feature by utilizing a deployment management application that provides a UI screen for inputting information about a new feature. In other implementations, the registration process is performed as part of the release pipeline of features. The registration information may include a name (or other identification) for the new feature, a version for the feature, the applications and/or devices to which the feature applies and the like. Furthermore, the registration information includes a parameter for feature(s) on which the new feature dependents. The feature may be identified by name, version number and/or a registration number or identification. This enables developers to enter the dependency information when they register a new feature. This information is used in both deployment and rollback of the new feature.

In some implementations, the dependency engine 154 includes a dependency machine-learning (ML) model 156 that automatically predicts feature dependencies. The dependency model 156 may be trained via a training mechanism by providing labeled feature dependency to a neural network or other type of ML model. The training data sets may include historical feature dependency data that includes information about the type of each feature and the features on which the feature depends. The trained dependency model 156 then can receive a new feature and based on parameters such as the type of changes, the applications/computing devices to which it applies, and the like, determine which previous features the new feature depends on. In some implementations, the predicted feature dependencies are presented to the user for confirmation.

Once specifics about the dependencies are determined, the deployment service 152 chooses a number of computing capacity units (e.g., server farms), servers, enterprises, and/or consumers for each stage of the deployment by taking into account the dependency data and examining the deployment state of each of the features on which the new feature depends.

Various elements of the system 100 are connected to each other via the network 160. The network 160 may be one or more wired or wireless networks or a combination of wired and wireless networks. The system 100 may be implemented in a single site or spread out in a number of buildings or geographically separated locations. The client devices 114, 118, 132, 136, and 142 may include any stationary or mobile computing device configured to communicate via the network 160. For example, the client devices may include workstations, desktop computers, laptop computers, tablets, phablets, smart phones, cellular phones, personal data assistants (PDA), printers, scanners, telephone, televisions smart watches, wearable computers, gaming devices/computers, head-mounted display devices or any other device that can be subject to software/hardware changes. The internal hardware structure of a client device and/or a server such as the servers 122, 124 and 126 is discussed in greater detail in regard to FIGS. 5 and 6. While it is possible for a very few of the client devices to have exactly the same hardware/software configurations, most of the client devices and servers have a unique hardware/software configuration that can be drastically different from other client devices.

It should be noted that although only a few client devices are shown in each tenant in FIG. 1, the actual number of client devices in each tenant varies depending on the size and type of the organization. For example, large enterprises may include hundreds or thousands of users and client devices, which may be spread out in different geographical locations. Similarly, the number of servers in each server farm varies from farm to farm and can include tens or hundreds of servers. Furthermore, while only one enterprises, one server farm and two consumers are depicted, an actual system 100 may include many more enterprises, server farms and consumers.

Figure 2:
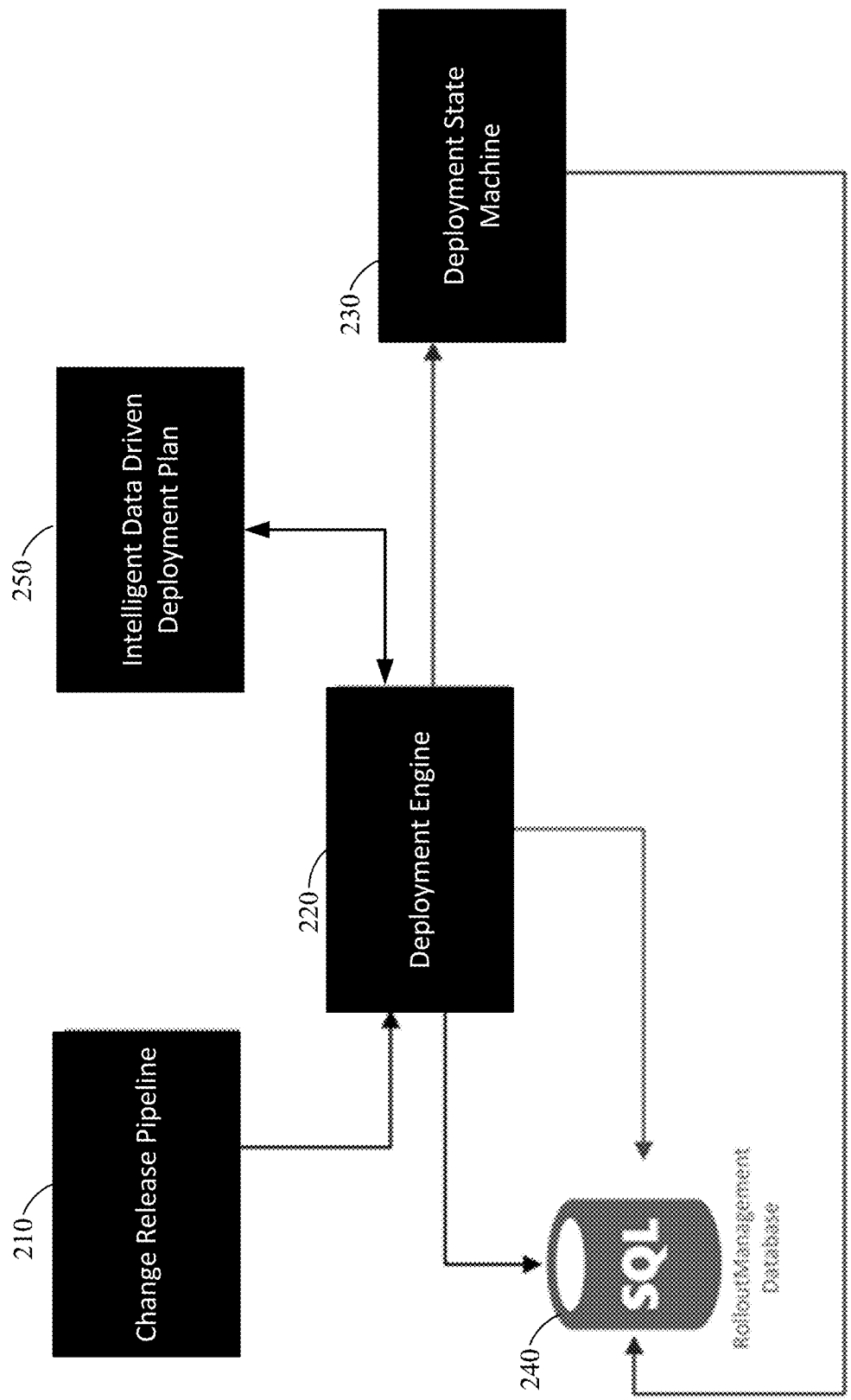
FIG. 2 is an example of some elements involved in implementing safe deployment of software changes.

FIG. 2 illustrates an example of some elements involved in implementing safe deployment of software changes. The process for deploying changes begins in the change release pipeline 210. The release pipeline 210 includes a change registration step during which developers (e.g., users responsible for creating, managing and/or releasing a change) register the change in the system. The registration process involves providing information about the change. The information includes a change name, change registration ID, change type, and the like. The information also includes dependency data for the change. The dependency data may specify a change registration ID, change name and/or change type on which the current change depends. In some implementations, this is provided by utilizing two dependency parameters. The dependency parameters are cross dependent change type and cross dependent change version. The cross dependent change type identifies the type of change the new change depends on (e.g., base change, specific job change, etc.). The cross dependent change version specifies the build version of the application the new change depends on. The build version may be provided by the user, or it may be determined by the system. For example, based on the provided dependency change type, the system can determine the version of the application to which the change should be applied (e.g., only devices having the specific build version of the application can receive the deployment). For example, a job package change type may be dependent on a base type change. Base type changes are changes that are present in the latest version of the base software. Thus, the latest software upgrade may be identified as a base change (e.g., base payload). Base changes are changes made via significant software updates. Often, a large number of future changes depend on such base changes. When the user identifies the dependent change type as a base change type, the system can determine the version number of the latest software upgrade and determine that the change should be applied to devices having that latest version. In practice, may change types have a cross dependency on a base type change. In an example, most change types depend on a GU change type or grid manager (GM) change type. Some change types are dependent on only one change type (e.g., LoopBuilds, JobAgentLoopBuilds, HotFixProdNew, etc.) Other change types depend on a number of change types. There are also situations in which new changes are not dependent on other changes, in which case the dependency parameters can be left blank.

The system can also determine the cross dependent change version for other change types. When the user only provides the dependent change type and not the dependent change version, the deployment engine 220 makes use of the deployment management database 240 to determine the dependent change version. That is because the deployment management database 240 includes a database of changes and their associate version numbers. Thus, information about the version number associated with a dependent change type can be looked up in the deployment management database 240. When multiple levels of dependencies are involved, the deployment engine 220 can create a dependency tree to determine the correct dependent change version.

The change release pipeline 210 may include a safe deployment service client (not shown) for safe registration of new changes. Each change has a unique release pipeline and calls the safe deployment service client to register a new change. In some implementations, the registration is done via a deployment script (e.g., RegisterPayloadWithRolloutServiceScript.ps1). Users may be provided with an option to supply the dependency parameters in the deployment script. When the parameters are not provided, the system proceeds without checking for dependency. This ensures that users are not forced to use the dependency feature if it is not useful or applicable to their changes.

The registration information including the dependency information is then provided by the change release pipeline 210 to the deployment engine 220. The deployment engine 220 may be included in and operate as part of a feature deployment service such as the feature deployment service 152 of FIG. 1. The deployment engine 220 performs various operations relating to deployment of changes. In some implementations, the operations include creating a deployment plan. The deployment plan refers to a plan or policy that sets the number of deployment stages, the duration of each deployment stage and/or the population to which the change should be deployed during each deployment stage. The number of deployment stages and the time period for each stage may depend on a number of factors such as the complexity of the new feature (e.g., low risk, high risk, etc.), the total number of computing devices (e.g., number of server farms, servers, enterprises, enterprises users and consumers) to which the new feature applies, the metrics by which success or failure of the deployment would be determined, and others. In addition to the number of stages and their time periods, the deployment plan may include the population size for each stage. The population size for each stage depends on a variety of factors which may include server farm metrics (e.g., farm temperature), tenant metrics, parameters relating to the new feature, and the like. In some implementations, the population size is a set number and depends on the number of stages.

To ensure that the population selected for each stage of the deployment plan complies with the dependency requirements provided in the registration, the deployment engine 220 initiates an additional check during the deployment process. This check may be performed via the deployment state machine 230. The deployment state machine keeps track of statuses of deployment and rollback advance requests. In an example, when a new change is prepared for deployment (e.g., when the deployment plan has been created and deployment initiated), the deployment engine 220 transmits a deployment advance request. Before the deployment advance request proceeds through the deployment pipeline, the deployment state machine 230 receives a copy of the deployment advance request. This is done so that the deployment state machine 230 can begin tracking the advancement of the deployment request. During this stage, the deployment state machine 230 performs a validation of the deployment progress of the parent changes on which the new change depends. This involves looking up the parent change in the deployment state machine 230 and determining the status of its' deployment on various devices. This may involve transmitting a request to the deployment management database 240 which includes databases containing information on various deployments/rollbacks in the system. For example, the deployment management database 240 may include one or more databases that store deployment registration information. The deployment registration information includes the registration ID, change name, change type, deployment plan for the change, and/or dependency data for changes in the system. The databases may store the change information based on time, change type and the like. In some implementations, the deployment management database 240 includes SQL databases. Furthermore, the deployment management database 240 may store the deployment state machine 230.

When verifying the dependency data via the deployment state machine 230 results in a determination that deployment of the parent changes have been completed, the deployment engine 220 proceeds with deploying the new change. When, however, the deployment state machine 230 indicates that the parent change has not been deployed or the dependent change version has not been implemented on a device or server yet, the deployment of the current change is stalled until the parent change deployment has been completed.

In some implementations, when the dependent change type is identified as being a base type change, the deployment engine 220 leverages an intelligent data driven deployment plan 250 to obtain a list of capacity units (e.g., server farms) to advance a change to. This may be done as part of creating the deployment plan, or it may be done before each new stage of the deployment to ensure the latest conditions regarding the devices in the computing environment (e.g., farm temperatures) are taken into account and version number parameters are used. When conditions such as capacity unit temperatures are checked for determining which capacity units to advance a new change to, in addition to checking the conditions, the build version of the software application is also checked. This is illustrated in FIG. 3 which depicts an example list of capacity units having different temperature and version numbers. In previous implementations, when only capacity unit temperature was taken into account in determining which capacity unit to advance a change to, the next 5 capacity units for deployment may have been capacity units 1 through 5, based on their temperature being cooler than capacity units 5 through 10. However, when the build version for the new change is required to be V (or higher), the capacity units that are selected are capacity units 1, 2, 4, 6 and 7. In this manner, in addition to temperature, the build version is also considered to ensure dependency requirements are met. In some implementations, this process is achieved via the following scripts:
1. PayloadWorkflow.cs—UpdatePayload( ) Workflow.GetWorkItems( )

[If nothing is returned from intelligent data driven deployment plan, no farms are ready yet. This stops the payload from advancing.]
2. DefaultScope.cs and EnvironmentWaveScope.cs— GetDefaultWorkItems( )

[Actual check of if no work items are returned from farm temperature throws here. These 2 scopes call intelligent data driven deployment plan.]
3. TemperatureUtility.cs—GetWorkitemFromFarmTemperatureService( )

[Update the farm temperature endpoint to include payload cross dependent payload value.]
4. FarmController.cs—GetFarmso, GetFarmNames( ), GetDistributedFarmNamesPerEnvironment( )

[Calls ValidateTargetBuildVersion( ) and obtains list from FarmDAO.cs.]
5. CommonUtility.cs—ValidateTargetBuildVersion( )

[Validates that build version is in the correct format.]
6. FarmDAO.cs—GetListofFarmsByPercentagePerEnvironment( ), GetListofFarmNamesByPercentage( )

[Contains actual checks for version comparison to return the coldest farms that are on the correct version.]

In some implementations, the intelligent data driven deployment plan 250 hosts static values for capacity unit build versions. The intelligent data driven deployment plan 250 may perform temperature and build version checks for a variety of capacity units (e.g., server farms) including public and government server farms. In other implementations, since the number of government or high security capacity units (e.g., server farms) is generally small, the build versions for these types of capacity units is periodically updated directly in the deployment management database 240. As a result, the deployment management database 240 can provide the required information to check the build version of government or high security capacity units against the target build version.

In some implementations, the process of deploying a change (i.e., a payload) includes prechecking for special actions, contacting the state machine and receiving an output from the state machine to determine if moving to the next stage of the deployment is possible, and then contacting the intelligent data driven deployment plan for obtaining the capacity units conditions and version information. In an example, this involves executing the TemperatureUtility-.GetWorkitemFromFarmTemperatureService function. To identify the correct capacity units, the target build version of the change may be transmitted to the intelligent data driven deployment plan. In response, the intelligent data driven deployment plan may provide a list of coldest capacity units having a build version that is higher than the target build version. Once the list of capacity units that are available and safe for receiving the change is provided, the change advances to the next stages of the deployment process which may include contacting a health engine to check for health, updating the change stage and work items, servicing a bus message, updating change stage and work items for the previous version and updating the change definition state. If during the capacity units conditions check, it is determined that the capacity units are not ready for receiving the new change (e.g., the build version is not equal to or higher than the target build version for any of the server farms), the deployment advancement is paused until one or more capacity units become ready for receiving the change.

Figure 4:
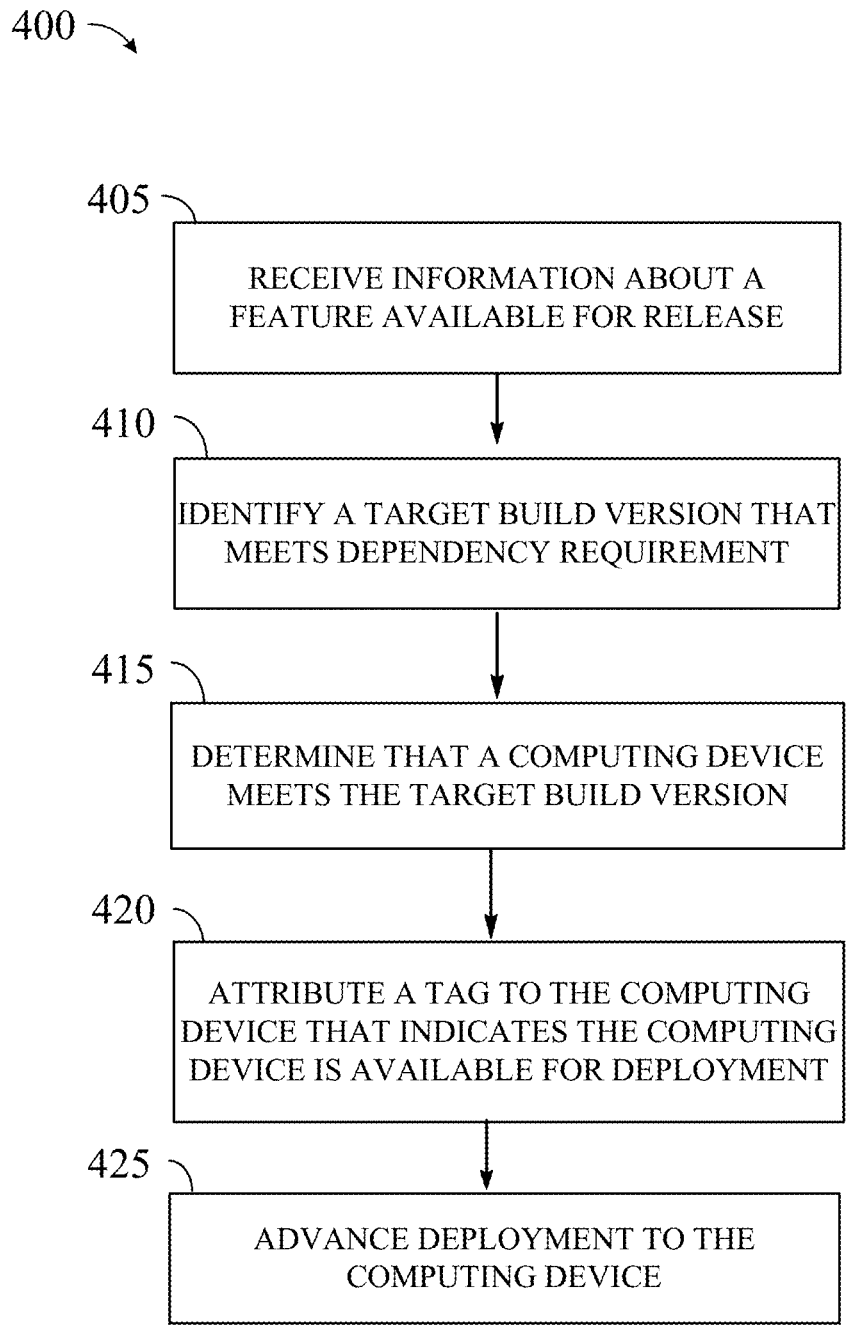
FIG. 4 is a flow diagram showing an example method for implementing safe deployment of a new feature in a computer environment.

FIG. 4 is a flow diagram showing an example method 400 for implementing safe deployment of a new feature in a computer environment. In an example, one or more steps of method 400 may be performed by a backend server such as the feature deployment service 152 of FIG. 1, while other steps may be performed by a deployment engine such as the deployment engine 220 of FIG. 2.

At 405, the method 400 begins by receiving information about a feature that has become available for release. The information is received from a user (e.g., a developer of the feature) and may be provided during a registration process for the new feature. The registration information includes information about the new feature such as the name of the feature, the application to which it applies, the devices to which it applies (type of capacity units such as public or government capacity units), and dependency information for the new feature. The dependency information may include the name or registration ID of another feature on which the new feature depends. The dependency information may also include a feature type (e.g., change type) on which the new feature depends. In some implementations, the dependency information also provides a target build version (e.g., minimum build version) that includes the required dependent features on which the new feature depends. The registration information may be provided via a portal or via a code script.

Once the dependency information is received, method 400 proceeds to identify a target build version that meets the dependency requirements specified in the registration information, at 410. When the target build version is provided, this simply involves extracting the target build version from the registration information. When, however, the registration information only includes the feature type or the feature identification of the parent feature, identifying the target build version includes accessing a deployment management database and identifying the earliest build version that includes the parent feature or the required feature type.

Once the target build version has been identified, method 400 proceeds to determine that a computing device in the computing environment meets the target build version, at 415. This may be done by checking a deployment state machine to determine a deployment status for the target build version. In some implementations, an intelligent data driven deployment plan is used to obtain capacity units condition information and capacity units build version information. Based on the capacity units condition information and the capacity units build version, capacity units meeting condition requirements and the target build version requirement are then identified as meeting the target build version. In some examples, capacity units having the coldest temperature which meet the target build version are identified as meeting the target build version and are selected for the next stage of the deployment process.

Computing devices that are identified as meeting the target build version are attributed a tag that indicates the computing device is available for deployment, at 420. This may involve tagging those computing devices in the deployment management database or simply identifying their deployment status in the deployment state machine. In some implementations, attributing a tag to the computing devices involves providing a list of those computing devices to the deployment engine for inclusion in a next stage of the deployment process. Attributing a tag may also refer to the build version itself which indicates whether or not a version of the software meets a dependency requirement. The build version is a global tag that can be used by various cloud servers and computing systems to determine dependency. Once the computing devices that meet the target build version have been identified, method 400 proceeds to advance the deployment process to the computing devices, at 425.

In this manner, the technical solution provides a mechanism for safe deployment of new features that takes into account feature cross dependency. This solution does not require prior deployment train, change, configuration, flight analysis or planning on how to identify how the changes are applied to the service. Instead, real time data is used to dynamically determine the dependent factors and attribute tags to mark them. The use of global tags makes the solution robust to changes in product software designs.

Figure 5:
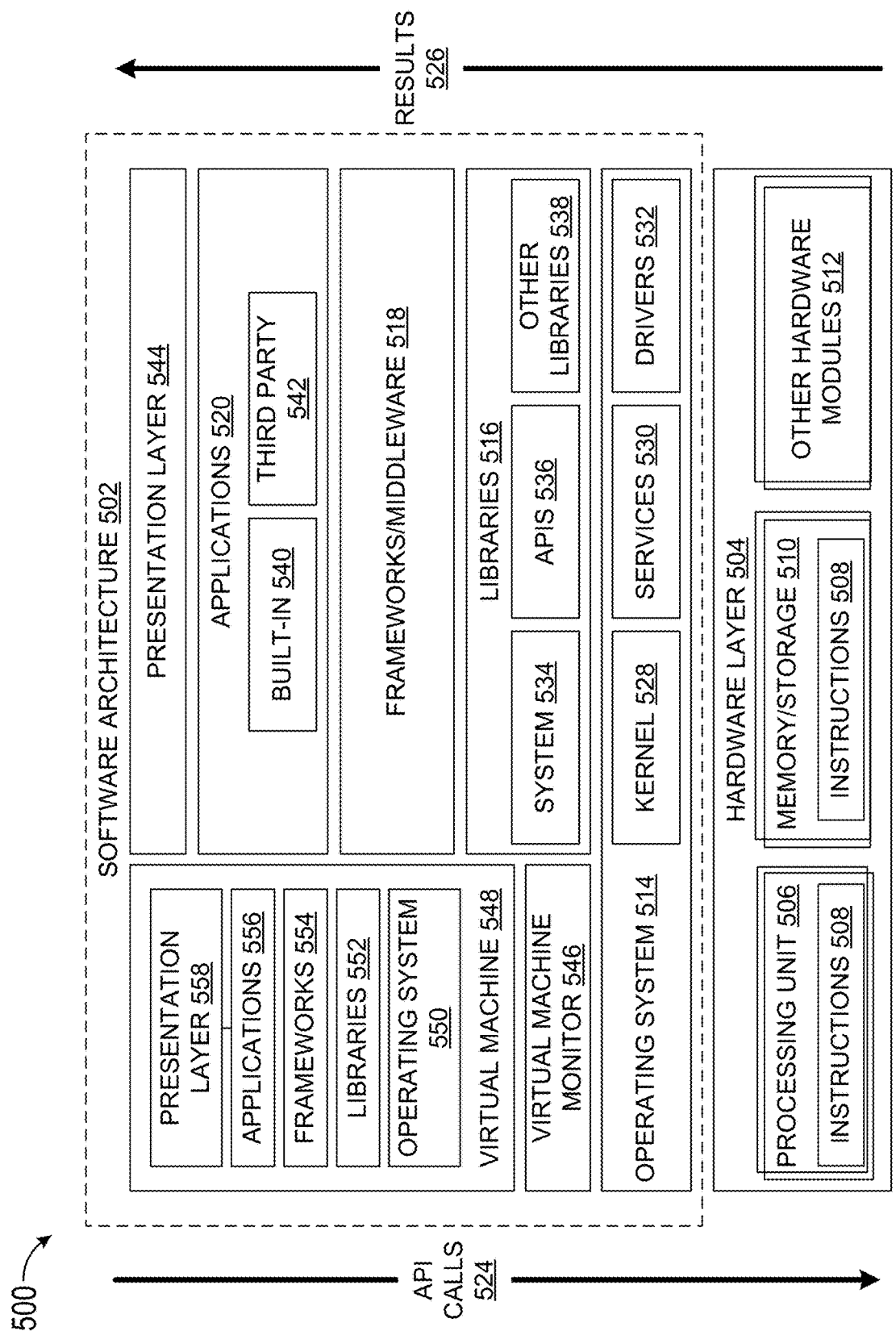
FIG. 5 is a block diagram illustrating an example software architecture, various portions of which may be used in conjunction with various hardware architectures herein described.

FIG. 5 is a block diagram 500 illustrating an example software architecture 502, various portions of which may be used in conjunction with various hardware architectures herein described, which may implement any of the above-described features. FIG. 5 is a non-limiting example of a software architecture, and it will be appreciated that many other architectures may be implemented to facilitate the functionality described herein. The software architecture 502 may execute on hardware such as client devices, native application provider, web servers, server clusters, external services, and other servers. A representative hardware layer 504 includes a processing unit 506 and associated executable instructions 508. The executable instructions 508 represent executable instructions of the software architecture 502, including implementation of the methods, modules and so forth described herein.

The hardware layer 504 also includes a memory/storage 510, which also includes the executable instructions 508 and accompanying data. The hardware layer 504 may also include other hardware modules 512. Instructions 508 held by processing unit 506 may be portions of instructions 508 held by the memory/storage 510.

The example software architecture 502 may be conceptualized as layers, each providing various functionality. For example, the software architecture 502 may include layers and components such as an operating system (OS) 514, libraries 516, frameworks 518, applications 520, and a presentation layer 544. Operationally, the applications 520 and/or other components within the layers may invoke API calls 524 to other layers and receive corresponding results 526. The layers illustrated are representative in nature and other software architectures may include additional or different layers. For example, some mobile or special purpose operating systems may not provide the frameworks/middleware 518.

The OS 514 may manage hardware resources and provide common services. The OS 514 may include, for example, a kernel 528, services 530, and drivers 532. The kernel 528 may act as an abstraction layer between the hardware layer 504 and other software layers. For example, the kernel 528 may be responsible for memory management, processor management (for example, scheduling), component management, networking, security settings, and so on. The services 530 may provide other common services for the other software layers. The drivers 532 may be responsible for controlling or interfacing with the underlying hardware layer 504. For instance, the drivers 532 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 516 may provide a common infrastructure that may be used by the applications 520 and/or other components and/or layers. The libraries 516 typically provide functionality for use by other software modules to perform tasks, rather than rather than interacting directly with the OS 514. The libraries 516 may include system libraries 534 (for example, C standard library) that may provide functions such as memory allocation, string manipulation, file operations. In addition, the libraries 516 may include API libraries 536 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 516 may also include a wide variety of other libraries 538 to provide many functions for applications 520 and other software modules.

The frameworks 518 (also sometimes referred to as middleware) provide a higher-level common infrastructure that may be used by the applications 520 and/or other software modules. For example, the frameworks 518 may provide various graphic user interface (GUI) functions, high-level resource management, or high-level location services. The frameworks 518 may provide a broad spectrum of other APIs for applications 520 and/or other software modules.

The applications 520 include built-in applications 540 and/or third-party applications 542. Examples of built-in applications 540 may include, but are not limited to, a contacts application, a browser application, a location application, a media application, a messaging application, and/or a game application. Third-party applications 542 may include any applications developed by an entity other than the vendor of the particular system. The applications 520 may use functions available via OS 514, libraries 516, frameworks 518, and presentation layer 544 to create user interfaces to interact with users.

Some software architectures use virtual machines, as illustrated by a virtual machine 548. The virtual machine 548 provides an execution environment where applications/modules can execute as if they were executing on a hardware machine (such as the machine depicted in block diagram 600 of FIG. 6, for example). The virtual machine 548 may be hosted by a host OS (for example, OS 514) or hypervisor, and may have a virtual machine monitor 546 which manages operation of the virtual machine 548 and interoperation with the host operating system. A software architecture, which may be different from software architecture 502 outside of the virtual machine, executes within the virtual machine 548 such as an OS 550, libraries 552, frameworks 554, applications 556, and/or a presentation layer 558.

Figure 6:
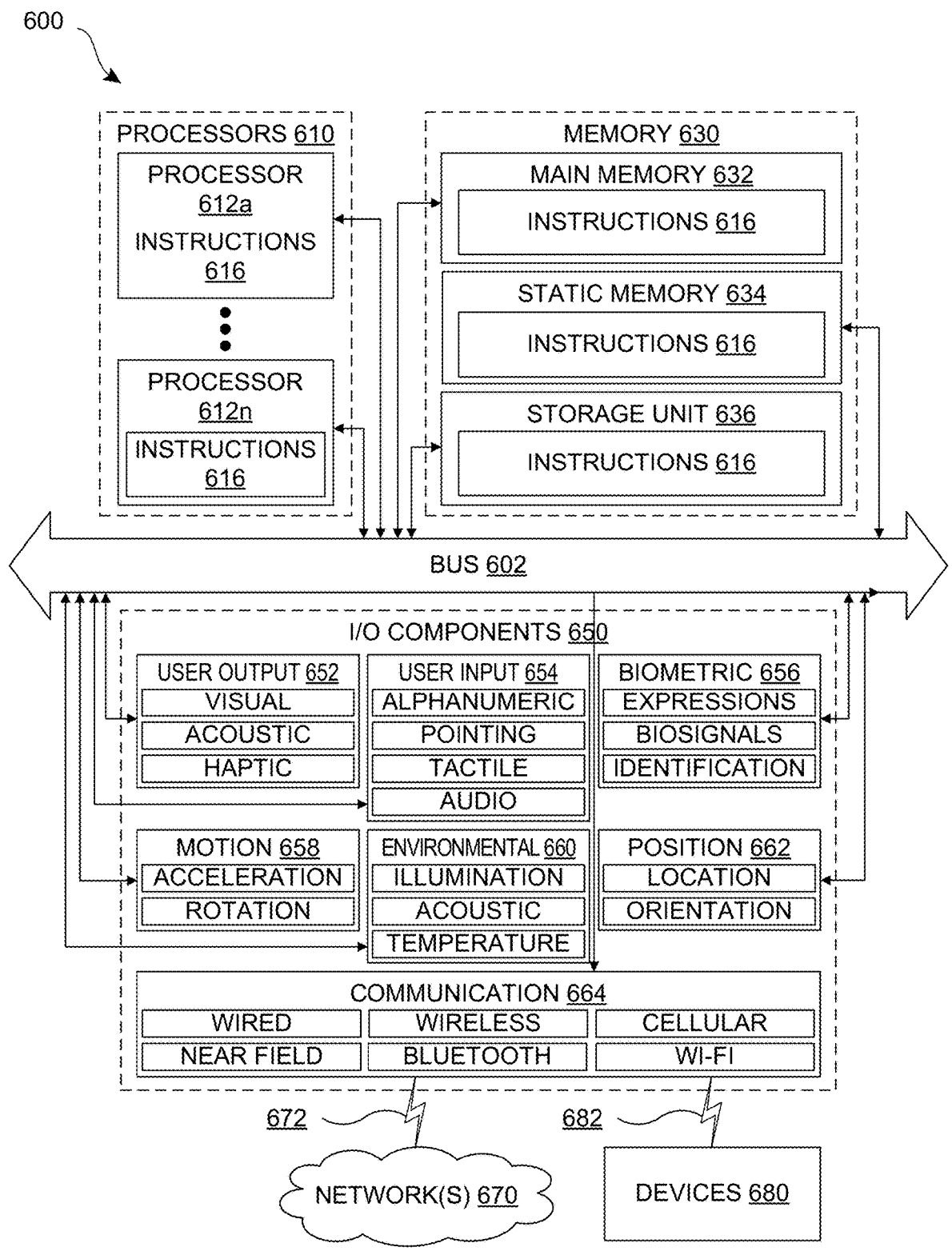
FIG. 6 is a block diagram illustrating components of an example machine configured to read instructions from a machine-readable medium and perform any of the features described herein.

FIG. 6 is a block diagram illustrating components of an example machine 600 configured to read instructions from a machine-readable medium (for example, a machine-readable storage medium) and perform any of the features described herein. The example machine 600 is in a form of a computer system, within which instructions 616 (for example, in the form of software components) for causing the machine 600 to perform any of the features described herein may be executed. As such, the instructions 616 may be used to implement methods or components described herein. The instructions 616 cause unprogrammed and/or unconfigured machine 600 to operate as a particular machine configured to carry out the described features. The machine 600 may be configured to operate as a standalone device or may be coupled (for example, networked) to other machines. In a networked deployment, the machine 600 may operate in the capacity of a server machine or a client machine in a server-client network environment, or as a node in a peer-to-peer or distributed network environment. Machine 600 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 600 is illustrated, the term "machine" includes a collection of machines that individually or jointly execute the instructions 616.

The machine 600 may include processors 610, memory 630, and I/O components 650, which may be communicatively coupled via, for example, a bus 602. The bus 602 may include multiple buses coupling various elements of machine 600 via various bus technologies and protocols. In an example, the processors 610 (including, for example, a central processing unit (CPU), a graphics processing unit (GPU), a digital signal processor (DSP), an ASIC, or a suitable combination thereof) may include one or more processors 612a to 612n that may execute the instructions 616 and process data. In some examples, one or more processors 610 may execute instructions provided or identified by one or more other processors 610. The term "processor" includes a multi-core processor including cores that may execute instructions contemporaneously. Although FIG. 6 shows multiple processors, the machine 600 may include a single processor with a single core, a single processor with multiple cores (for example, a multi-core processor), multiple processors each with a single core, multiple processors each with multiple cores, or any combination thereof. In some examples, the machine 600 may include multiple processors distributed among multiple machines.

The memory/storage 630 may include a main memory 632, a static memory 634, or other memory, and a storage unit 636, both accessible to the processors 610 such as via the bus 602. The storage unit 636 and memory 632, 634 store instructions 616 embodying any one or more of the functions described herein. The memory/storage 630 may also store temporary, intermediate, and/or long-term data for processors 610. The instructions 616 may also reside, completely or partially, within the memory 632, 634, within the storage unit 636, within at least one of the processors 610 (for example, within a command buffer or cache memory), within memory at least one of I/O components 650, or any suitable combination thereof, during execution thereof. Accordingly, the memory 632, 634, the storage unit 636, memory in processors 610, and memory in I/O components 650 are examples of machine-readable media.

As used herein, "machine-readable medium" refers to a device able to temporarily or permanently store instructions and data that cause machine 600 to operate in a specific fashion. The term "machine-readable medium," as used herein, does not encompass transitory electrical or electromagnetic signals per se (such as on a carrier wave propagating through a medium); the term "machine-readable medium" may therefore be considered tangible and non-transitory. Non-limiting examples of a non-transitory, tangible machine-readable medium may include, but are not limited to, nonvolatile memory (such as flash memory or read-only memory (ROM)), volatile memory (such as a static random-access memory (RAM) or a dynamic RAM), buffer memory, cache memory, optical storage media, magnetic storage media and devices, network-accessible or cloud storage, other types of storage, and/or any suitable combination thereof. The term "machine-readable medium"

applies to a single medium, or combination of multiple media, used to store instructions (for example, instructions 616) for execution by a machine 600 such that the instructions, when executed by one or more processors 610 of the machine 600, cause the machine 600 to perform and one or more of the features described herein. Accordingly, a "machine-readable medium" may refer to a single storage device, as well as "cloud-based" storage systems or storage networks that include multiple storage apparatus or devices.

The I/O components 650 may include a wide variety of hardware components adapted to receive input, provide output, produce output, transmit information, exchange information, capture measurements, and so on. The specific I/O components 650 included in a particular machine will depend on the type and/or function of the machine. For example, mobile devices such as mobile phones may include a touch input device, whereas a headless server or IoT device may not include such a touch input device. The particular examples of I/O components illustrated in FIG. 6 are in no way limiting, and other types of components may be included in machine 600. The grouping of I/O components 650 are merely for simplifying this discussion, and the grouping is in no way limiting. In various examples, the I/O components 650 may include user output components 652 and user input components 654. User output components 652 may include, for example, display components for displaying information (for example, a liquid crystal display (LCD) or a projector), acoustic components (for example, speakers), haptic components (for example, a vibratory motor or force-feedback device), and/or other signal generators. User input components 654 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 650 may include biometric components 656, motion components 658, environmental components 660 and/or position components 662, among a wide array of other environmental sensor components. The biometric components 656 may include, for example, components to detect body expressions (for example, facial expressions, vocal expressions, hand or body gestures, or eye tracking), measure biosignals (for example, heart rate or brain waves), and identify a person (for example, via voice-, retina-, and/or facial-based identification). The position components 662 may include, for example, location sensors (for example, a Global Position System (GPS) receiver), altitude sensors (for example, an air pressure sensor from which altitude may be derived), and/or orientation sensors (for example, magnetometers). The motion components 658 may include, for example, motion sensors such as acceleration and rotation sensors. The environmental components 660 may include, for example, illumination sensors, acoustic sensors and/or temperature sensors.

The I/O components 650 may include communication components 664, implementing a wide variety of technologies operable to couple the machine 600 to network(s) 670 and/or device(s) 680 via respective communicative couplings 672 and 682. The communication components 664 may include one or more network interface components or other suitable devices to interface with the network(s) 670. The communication components 664 may include, for example, components adapted to provide wired communication, wireless communication, cellular communication, Near Field Communication (NFC), Bluetooth communication, Wi-Fi, and/or communication via other modalities. The device(s) 680 may include other machines or various peripheral devices (for example, coupled via USB).

In some examples, the communication components 664 may detect identifiers or include components adapted to detect identifiers. For example, the communication components 864 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 662, such as, but not limited to, geo-location via Internet Protocol (IP) address, location via Wi-Fi, cellular, NFC, Bluetooth, or other wireless station identification and/or signal triangulation.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

In the foregoing detailed description, numerous specific details are set forth by way of examples in order to provide a thorough understanding of the relevant teachings. It will be apparent to persons of ordinary skill, upon reading this description, that various aspects can be practiced without such details. In other instances, well known methods, procedures, components, and/or circuitry have been described at a relatively high-level, without detail, in order to avoid unnecessarily obscuring aspects of the present teachings.

Generally, functions described herein (for example, the features illustrated in FIGS. 1-5) can be implemented using software, firmware, hardware (for example, fixed logic, finite state machines, and/or other circuits), or a combination of these implementations. In the case of a software implementation, program code performs specified tasks when executed on a processor (for example, a CPU or CPUs). The program code can be stored in one or more machine-readable memory devices. The features of the techniques described herein are system-independent, meaning that the techniques may be implemented on a variety of computing systems having a variety of processors. For example, implementations may include an entity (for example, software) that causes hardware to perform operations, e.g., processors functional blocks, and so on. For example, a hardware device may include a machine-readable medium that may be configured to maintain instructions that cause the hardware device, including an operating system executed thereon and associated hardware, to perform operations. Thus, the instructions may function to configure an operating system and associated hardware to perform the operations and thereby configure or otherwise adapt a hardware device to perform functions described above. The instructions may be provided by the machine-readable medium through a variety of different configurations to hardware elements that execute the instructions.

In the following, further features, characteristics and advantages of the invention will be described by means of items:

Item 1. A data processing system comprising:
 a processor; and
 a memory in communication with the processor, the memory comprising executable instructions that, when executed by the processor, cause the data processing system to perform functions of:
  receiving information about a first feature, the first feature being a feature that has become available for being deployed in a computing environment, the information received including feature dependency information, wherein the dependency information indicates a dependency requirement for the first feature;
  identifying, based on the dependency information, a target build version that meets the dependency requirement;
  determining that a computing device meets the target build version;
  upon determining that the computing device meets the target build version, attributing a tag to the computing device, the tag identifying the computing device as being available for deployment of the feature; and
  advancing deployment of the feature to the computing device.

Item 2. The data processing system of item 1, wherein the dependency information includes a second feature on which the first feature depends.

Item 3. The data processing system of any of items 1 or 2, wherein the dependency information includes a feature type on which the first feature depends.

Item 4. The data processing system of item 3, wherein the feature type is a base feature type.

Item 5. The data processing system of item 3, wherein identifying, based on the dependency information, the target build version that meets the dependency requirement includes identifying an earliest build version that includes the feature type on which the first feature depends.

Item 6. The data processing system of any preceding item, wherein identifying, based on the dependency information, the target build version that meets the dependency requirement includes accessing a deployment management database and determining based on information in the deployment management database that the target build version meets the dependency requirement.

Item 7. The data processing system of any preceding item, wherein determining that the computing device meets the target build version includes checking a deployment state machine to determine a deployment status for the target build version.

Item 8. The data processing system of any preceding item, wherein the dependency information includes the target build version.

Item 9. A method for implementing a safe deployment of a first feature in a computing environment, comprising:
 receiving registration information for the first feature, the registration information including at least one of a second feature on which the first feature depends and a feature type on which the first feature depends;
 identifying, based on the second feature or the feature type, a target build version that meets dependency requirements of the second feature or the feature type;
 obtaining a list of build versions for a plurality of computing devices in the computing environment;
 identifying, from among the plurality of computing devices, one or more computing devices that have build versions that meet the target build version;
 marking one or more computing devices as being available for deployment of the feature; and
 advancing deployment of the feature to the one or more computing devices.

Item 10. The method of item 9, further comprising:
 utilizing an intelligent data driven deployment plan to obtain capacity unit condition information about the plurality of computing devices in the computing environment; and
 utilizing the capacity unit condition information and the list of build versions to identify a capacity unit for deploying the feature to in a next stage of a deployment process.

Item 11. The method of any of items 9 or 10, wherein identifying, based on the second feature or the feature type, the target build version that meets dependency requirements of the second feature or the feature type includes identifying an earliest build version that includes at least one of the second feature or a feature type on which the first feature depends.

Item 12. The method of any of items 9-11, wherein identifying, based on the second feature or the feature type, the target build version that meets dependency requirements of the second feature or the feature type includes accessing a deployment management database and determining based on information in the deployment management database that the target build version includes the second feature or the feature type.

Item 13. The method of item 12, wherein identifying, from among the plurality of computing devices, one or more computing devices that have build versions that meet the target build version includes checking a deployment state machine to determine a deployment status for the target build versions.

Item 14. A non-transitory computer readable medium on which are stored instructions that when executed cause a programmable device to perform functions of:
 receiving information about a first feature, the first feature being a feature that has become available for being deployed in a computing environment, the information received including feature dependency information, wherein the dependency information indicates a dependency requirement for the first feature;
 identifying, based on the dependency information, a target build version that meets the dependency requirement;
 determining that a computing device meets the target build version;
 upon determining that the computing device meets the target build version, attributing a tag to the computing device, the tag identifying the computing device as being available for deployment of the feature; and
 advancing deployment of the feature to the computing device.

Item 15. The non-transitory computer readable medium of item 14, wherein the dependency information includes a second feature on which the first feature depends.

Item 16. The non-transitory computer readable medium of any of items 14 or 15, wherein the dependency information includes a feature type on which the first feature depends.

Item 17. The non-transitory computer readable medium of item 16, wherein the feature type is a base feature type.

Item 18. The non-transitory computer readable medium of any of items 14-17, wherein identifying, based on the dependency information, the target build version that meets the dependency requirement includes identifying an earliest build version that includes the feature type on which the first feature depends.

Item 19. The non-transitory computer readable medium of any of items 14-18, wherein determining that the computing device meets the target build version includes checking a deployment state machine to determine a deployment status for the target build version.

Item 20. The non-transitory computer readable medium of any of items 14-19, wherein the dependency requirement is determined by a machine-learning model.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows, and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein.

Relational terms such as first and second and the like may be used solely to distinguish one entity or action from another without necessarily requiring or implying any actual such relationship or order between such entities or actions. The terms "comprises," "comprising," and any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "a" or "an" does not, without further constraints, preclude the existence of additional identical elements in the process, method, article, or apparatus that comprises the element.

The Abstract of the Disclosure is provided to allow the reader to quickly identify the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that any claim requires more features than the claim expressly recites. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A data processing system comprising:
   a processor; and
   a memory in communication with the processor, the memory comprising executable instructions that, when executed by the processor, cause the data processing system to perform functions of:
   receiving information about a first feature of a software application, comprised of a code change and/or a configuration update to the software application, the first feature being a feature that has become available for being deployed as a feature of the software application in a computing environment, the information received including feature dependency information, wherein the dependency information indicates a dependency requirement for the first feature upon a second feature of the software application in order for the first feature to operate in the software application;
   identifying, based on the dependency information, a target build version of the software application that meets the dependency requirement for the first feature;
   determining, using a machine learning model, that a computing device meets the dependency requirement for the first feature in the target build version;
   upon determining that the computing device, in which the software application is stored, meets the dependency requirement for the first feature in the target build version, attributing a tag to the computing device, the tag identifying the computing device as being available for deployment of the first feature to the computing device; and
   advancing deployment of the first feature to the software application in the computing device to provide the code change and/or the configuration update to the software application in the computing device based upon the tag identifying the computing device as being available for deployment of the first feature to the computing device.

2. The data processing system of claim 1, wherein the dependency information includes a feature type on which the first feature depends.

3. The data processing system of claim 2, wherein the feature type is a base feature type.

4. The data processing system of claim 2, wherein identifying, based on the dependency information, the target build version that meets the dependency requirement includes identifying an earliest build version that includes the feature type on which the first feature depends.

5. The data processing system of claim 1, wherein identifying, based on the dependency information, the target build version that meets the dependency requirement includes accessing a deployment management database and determining based on information in the deployment management database that the target build version meets the dependency requirement.

6. The data processing system of claim 1, wherein determining that the computing device meets the target build version includes checking a deployment state machine to determine a deployment status for the target build version.

7. The data processing system of claim 1, wherein the dependency information includes the target build version.

8. A method for implementing a safe deployment of a first feature of a software application, comprised of a code change and/or a configuration update to the software application in a computing environment, comprising:
receiving registration information for the first feature, the registration information including at least one of a second feature of the software application on which the first feature depends and a feature type on which the first feature depends;
identifying, based on the second feature or the feature type, a target build version of the software application that meets dependency requirements of the second feature or the feature type;
obtaining a list of build versions for a plurality of computing devices in the computing environment;
identifying, using a machine learning model, from among the plurality of computing devices, one or more computing devices that have build versions that meet the target build version;
marking one or more computing devices as being available for deployment of the first feature; and
advancing deployment of the first feature to the one or more computing devices to provide the code change and/or the configuration update to the software application in the one or more computing devices based upon the one or more computing devices being marked as being available for deployment of the first feature to the computing device.

9. The method of claim 8, further comprising:
utilizing an intelligent data driven deployment plan to obtain capacity unit condition information about the plurality of computing devices in the computing environment; and
utilizing the capacity unit condition information and the list of build versions to identify a capacity unit for deploying the feature to in a next stage of a deployment process.

10. The method of claim 8, wherein identifying, based on the second feature or the feature type, the target build version that meets dependency requirements of the second feature or the feature type includes identifying an earliest build version that includes at least one of the second feature or a feature type on which the first feature depends.

11. The method of claim 8, wherein identifying, based on the second feature or the feature type, the target build version that meets dependency requirements of the second feature or the feature type includes accessing a deployment management database and determining based on information in the deployment management database that the target build version includes the second feature or the feature type.

12. The method of claim 11, wherein identifying, from among the plurality of computing devices, one or more computing devices that have build versions that meet the target build version includes checking a deployment state machine to determine a deployment status for the target build versions.

13. A non-transitory computer readable medium on which are stored instructions that when executed cause a programmable device to perform functions of:
receiving information about a first feature of a software application, comprised of a code change and/or a configuration update to the software application, the first feature being a feature that has become available for being deployed as a feature of the software application in a computing environment, the information received including feature dependency information, wherein the dependency information indicates a dependency requirement for the first feature upon a second feature of the software application in order for the first feature to operate in the software application;
identifying, based on the dependency information, a target build version of the software application that meets the dependency requirement for the first feature;
determining, using a machine learning model, that a computing device meets the dependency requirement for the first feature in the target build version;
upon determining that the computing device, in which the software application is stored, meets the dependency requirement for the first feature in the target build version, attributing a tag to the computing device, the tag identifying the computing device as being available for deployment of the first feature to the computing device; and
advancing deployment of the first feature to the software application in the computing device to provide the code change and/or the configuration update to the software application in the computing device based upon the tag identifying the computing device as being available for deployment of the first feature to the computing device.

14. The non-transitory computer readable medium of claim 13, wherein the dependency information includes a feature type on which the first feature depends.

15. The non-transitory computer readable medium of claim 14, wherein the feature type is a base feature type.

16. The non-transitory computer readable medium of claim 13, wherein identifying, based on the dependency information, the target build version that meets the dependency requirement includes identifying an earliest build version that includes a feature type on which the first feature depends.

17. The non-transitory computer readable medium of claim 13, wherein determining that the computing device meets the target build version includes checking a deployment state machine to determine a deployment status for the target build version.

* * * * *